United States Patent
Mack et al.

[19]

[11] Patent Number: 5,844,941
[45] Date of Patent: Dec. 1, 1998

[54] PARALLEL ADAPTIVE EQUALIZER CIRCUIT

[75] Inventors: Michael P. Mack, Mountain View; Kenneth T. McBride, Sunnyvale, both of Calif.

[73] Assignee: Micro Linear Corporation, San Jose, Calif.

[21] Appl. No.: 795,450

[22] Filed: Feb. 3, 1997

Related U.S. Application Data

[63] Continuation of Ser. No. 504,775, Jul. 20, 1995, abandoned.

[51] Int. Cl.⁶ ..................................................... H03H 7/30
[52] U.S. Cl. ........................................... 375/232; 375/235
[58] Field of Search ..................................... 375/229, 230, 375/232, 257, 349, 346, 285, 233, 234, 231, 235; 333/18, 28 R; 364/724.19, 724.2

[56] References Cited

U.S. PATENT DOCUMENTS

| | | | |
|---|---|---|---|
| 3,336,540 | 8/1967 | Kwartiroff et al. | 333/28 R |
| 3,727,136 | 4/1973 | Schroeder et al. | 325/320 |
| 3,728,649 | 4/1973 | Waldhauer | 333/18 |
| 3,758,881 | 9/1973 | Rummler | 333/16 |
| 4,035,725 | 7/1977 | Guidoux | 325/42 |
| 4,250,458 | 2/1981 | Richmond et al. | 329/305 |
| 4,459,698 | 7/1984 | Yumoto et al. | 375/236 |
| 4,553,248 | 11/1985 | Reed | 375/14 |
| 4,555,788 | 11/1985 | Merrill | 375/11 |
| 4,607,231 | 8/1986 | Nakayama | 375/232 |
| 4,791,390 | 12/1988 | Harris et al. | 333/166 |
| 4,970,722 | 11/1990 | Preschutti | 370/94.3 |
| 5,058,047 | 10/1991 | Chung | 364/724.19 |
| 5,097,482 | 3/1992 | Serizawa et al. | 375/233 |
| 5,230,007 | 7/1993 | Baum | 375/232 |
| 5,233,633 | 8/1993 | Baum et al. | 375/232 |
| 5,257,286 | 10/1993 | Ray | 375/12 |
| 5,278,777 | 1/1994 | Cummins | 364/574 |
| 5,490,121 | 2/1996 | Gardener et al. | 375/232 |

OTHER PUBLICATIONS

U.S. application No. 08/102,695, Korn, filed Aug. 5, 1993.
R. L. Geiger and E. Sánchez–Sinencio; "Active Filter Design Using Operational Transconductance Amplifiers: A Tutorial"; IEEE Circuits and Devices; Mar. 1985, pp. 20–32.
Yoshitaka Takasaki; Digital Tansmission Design and Jitter Analysis; 1991 Artech House, Inc., pp. 71–81.

*Primary Examiner*—Tesfaldet Bocure
*Attorney, Agent, or Firm*—Haverstock & Owens LLP

[57] ABSTRACT

An adaptive equalizer is configured to reconstruct electronic signals which are transmitted over signal cables, such as twisted pair cables. The equalizer satisfactorily reconstructs the signals over a broad range of cable lengths. Using the known degradation characteristics for a cable over a desired range of lengths, the adaptive equalizer includes multiple equalization paths, each of which are configured to reconstruct the input voltage signal optimized for a particular cable length. The degraded input signal is split according to a predetermined relationship into an appropriate two of the multiple equalization paths as controlled by a control logic circuit. Though each path is optimized to reconstruct the signal for a particular length of cable, the adaptive control adds a function of the actual cable length for more accurately reconstructing the signal. Each of the two active paths forms a partially reconstructed signal which is summed to form a composite reconstructed output signal. The control logic circuitry monitors the level of the output signal and adjusts a control signal appropriately in order to maintain the amplitude of the output signal in the required range. The control signal is used to determine the ratio of the input signal between the two active paths. A separate offset correction circuit also monitors the output signal for any offset and provides a correction signal to the input of the equalizer to compensate for the presence of any offset within the signal.

20 Claims, 11 Drawing Sheets

PARALLEL ADAPTIVE EQUALIZER CIRCUIT

This is a Continuation of application Ser. No. 08/504,775 filed on Jul. 20, 1995, now abandoned.

FIELD OF THE INVENTION

The present invention relates to the field of equalizer circuits. More particularly, the present invention relates to the field of equalizer circuits which have the ability to enhance equalization for cables of varying intermediate lengths.

BACKGROUND OF THE INVENTION

As is well known, signals transmitted over cable from a transmitter circuit to a receiver circuit will degrade depending on the type of cable, the length of the cable between the transmitter and receiver and the frequency of the signal being transmitted. When digital information is transmitted over the cable, the degradation of the signal may be severe enough to result in the loss of one or more bits of information. In order to avoid the effects of signal degradation from cable transmission, steps may be taken to prevent the losses due to transmission of signals over a length of cable. Typically, the transmitted signal is reconstructed after transmission or boosted before transmission. Also, to prevent the losses due to cable transmission, some practitioners have used high grade shielded cable for such applications as local area networks communicating over coaxial signal cable. Use of a fiber optic cable is still another available option which will minimize the losses due to signal transmission over a length of cable. However, the use of a high quality transmission medium such as high grade shielded cable or fiber optic cable is significantly more expensive than conventional wire cable and frequently not as convenient.

For local area networks, system designers and users prefer to use twisted pair signal wires because of the low cost and availability of this type of cable. The use of twisted pair signal wires provides a minimal cost option because typically twisted pair signal wires are readily accessible at many locations within a building without rewiring for a computer network. Telephone equipment installers typically install telephones with cable having four wires, only two of which are needed for the telephone signal. The remaining two wires are typically not used by the telephone company but are automatically installed to every location where there is a telephone outlet. This leaves an extra pair of twisted signal wires accessible at every phone outlet. This extra pair of twisted signal wires is typically used for a local area computer network. However, the transmission of signals over long distances of twisted pair signal wires results in significant degradation of the original signal. Thus, using this extra twisted pair of wires for a local area network may be extremely inexpensive if the problems associated with degraded signals are overcome.

To reconstruct a transmitted signal from a received signal, others have characterized the typical signal degradation and attempted to perform an inverse degradation operation. Such inverse or reconstructing operations may be performed at either the transmitting or the receiving end of the signal cable. As a simplistic example, assume that it is known that a particular signal cable over a specified length attenuates the voltage in a signal that is transmitted by 50%, i.e., the amplitude of the signal is reduced by half. If a 10 volt signal is transmitted from a first end of the particular signal cable, a 5 volt signal will be received at a second end of the particular signal cable. To correct for this known degradation, a system designer could amplify the 5 volt signal at the second end of the cable by a factor of two and apply the resulting 10 volt signal to the receiver circuit. In the alternative, the system designer could amplify the 10 volt signal at the output of the transmitter circuit at the first end of the cable by a factor of two and apply the resulting 20 volt signal to the signal cable. Then, after transmission through the cable, the receiver at the second end of the cable will receive the original 10 volt signal, due to the degradation of the cable.

Figure 1:
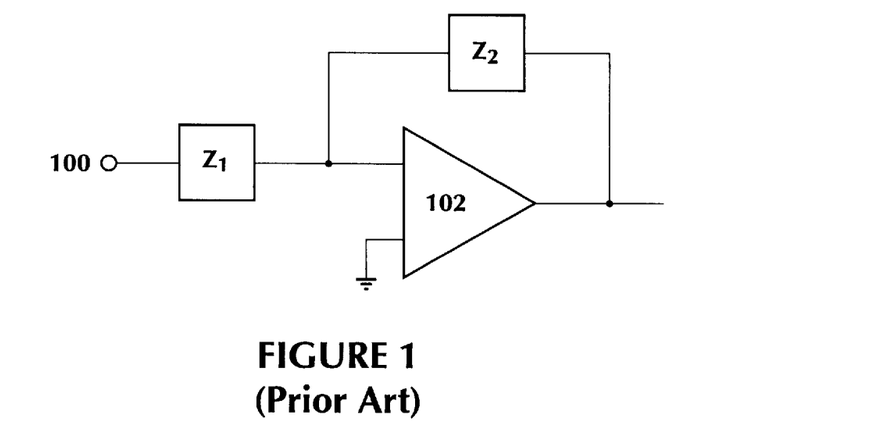
FIG. 1 illustrates a reconstruction circuit of the prior art.

An example of a reconstruction circuit used by others is illustrated in FIG. 1. A signal is applied to the input terminal 100 of the circuit and is coupled to a first terminal of an input impedance $Z_1$. The second terminal of the input impedance $Z_1$ is coupled to a negative input of an amplifier 102. The positive terminal of the amplifier 102 is coupled to ground. A feedback impedance $Z_2$ is coupled between the output of the amplifier 102 and the negative input. Either the impedance $Z_1$, the impedance $Z_2$, or both are controllable for adjusting the amount of reconstruction to the signal. This reconstruction circuit may be coupled to either the transmitting or receiving end of the signal cable, but is typically coupled to the transmitting end.

Figure 2:
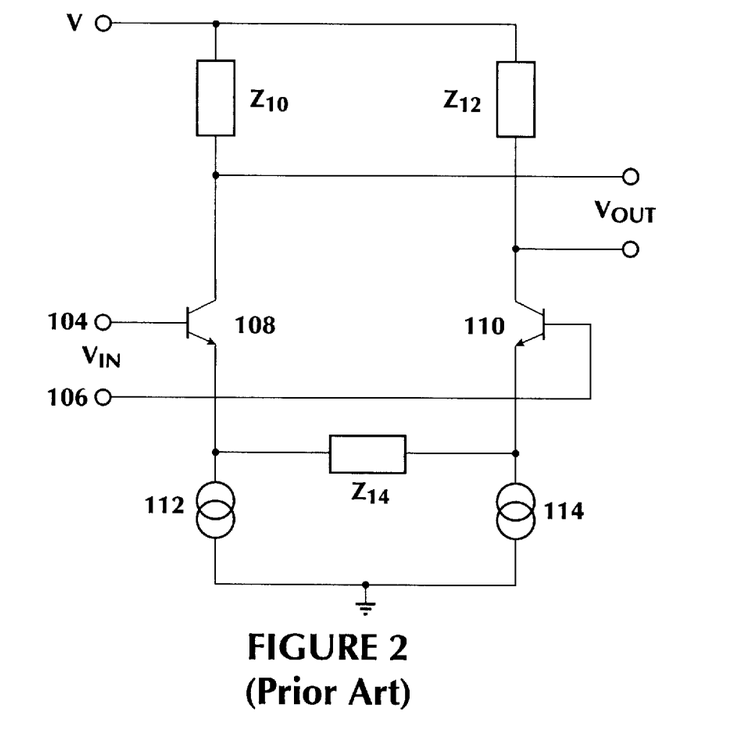
FIG. 2 illustrates a differential amplifier reconstruction circuit of the prior art.

In another approach, the signal to be reconstructed is coupled to the inputs of a differential amplifier as shown in FIG. 2. In particular, each of the two conductors of the signal cable are differentially coupled to one of the two inputs 104 and 106 of the circuit. A first input 104 is coupled to the base of a first NPN bipolar transistor 108. A second input 106 is coupled to the base of a second NPN bipolar transistor 110. The collector of the first transistor 108 is coupled to an impedance load $Z_{10}$ which in turn is also coupled to a supply voltage V. Similarly, the collector of the second transistor 110 is coupled to an impedance load $Z_{12}$ which in turn is also coupled to the supply voltage V. The emitter of the transistor 108 is coupled to a first terminal of a two terminal impedance load $Z_{14}$ and to a current source 112 which in turn is coupled to ground. Similarly, the emitter of the transistor 110 is coupled to a second terminal of the impedance load $Z_{14}$ and to a current source 114 which in turn is coupled to ground.

Generally, with such circuits, the impedance of the load $Z_{10}$ will equal the impedance of the load $Z_{12}$. The transfer function of the circuit can then be expressed as:

$$\frac{V_{out}}{V_{in}} \approx 2\frac{Z_{10}}{Z_{14}}$$

Using techniques such as these, it is possible to optimize a circuit precisely designed to correct for a known length of cable with precisely understood degradation characteristics. However, for such applications, such as local area networks, the users typically do not have the expertise to design such a circuit. It is clear that the expense of commissioning such a solution for each node on a network would be prohibitive. Further, it would be an unacceptable solution to restrict each resident on a network to a location within 25 meters of each other.

Figure 3:
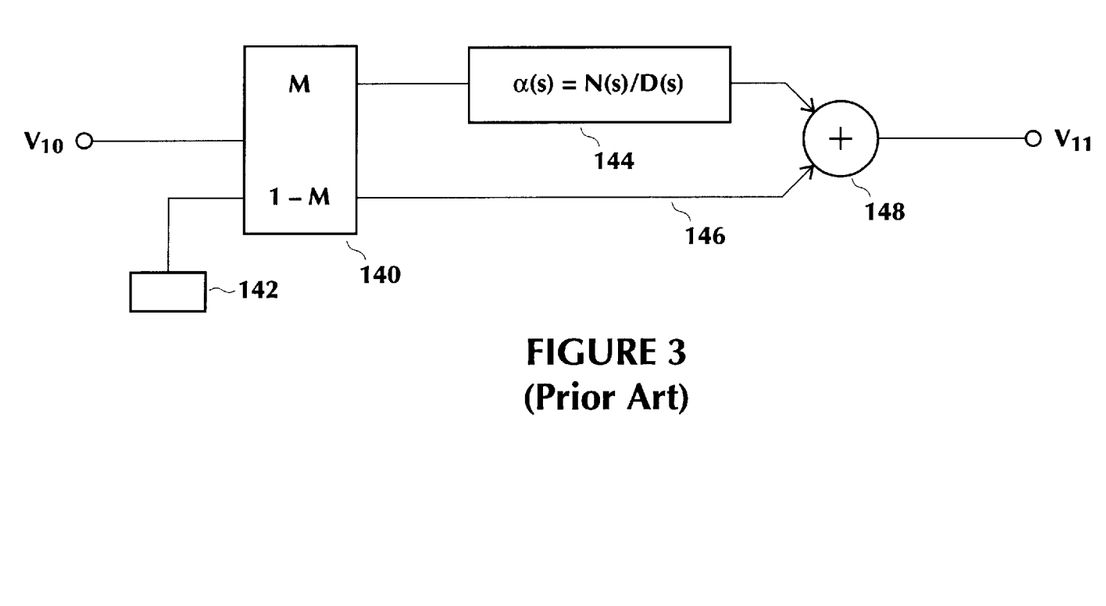
FIG. 3 illustrates an adaptive equalizer circuit according to the prior art including two equalization paths.

An adaptive equalizer circuit for reconstructing a transmitted signal over lengths of cable is taught in U.S. patent application Ser. No. 08/102,695, filed by Thomas Korn on Aug. 5, 1993. A block diagram schematic for a two-path adaptive equalizer circuit according to Korn is illustrated in FIG. 3. The adaptive equalizer circuit inputs the signal to be reconstructed into a splitter 140 which then splits the input signal into two paths according to a predetermined relationship based on the level of the output signal measured at the node V11. Each of the paths 144 and 146 are optimized to reconstruct signals for a particular length of cable. The first path 146 is optimized to reconstruct signals for a length of cable equal to zero meters and the second path 144 is optimized to reconstruct signals for a length of cable equal to 100 meters. For intermediate lengths of cable between 0 and 100 meters, the input signal is split proportionately between the two equalization paths so that each path forms a partially reconstructed signal. The outputs of the two paths 144 and 146 are then summed together by the summing circuit 148 to provide the reconstructed output signal for the intermediate length of cable. The splitter 140 is controlled by a controller circuit 142 which monitors the reconstructed output signal at the node V11 and compares it to an expected output signal. If the reconstructed output signal is not what the controller circuit 142 expects, the proportion of the signal through each path 144 and 146 is adjusted accordingly. This allows a transmitted signal to be reconstructed for intermediate lengths of cable.

Figure 4:
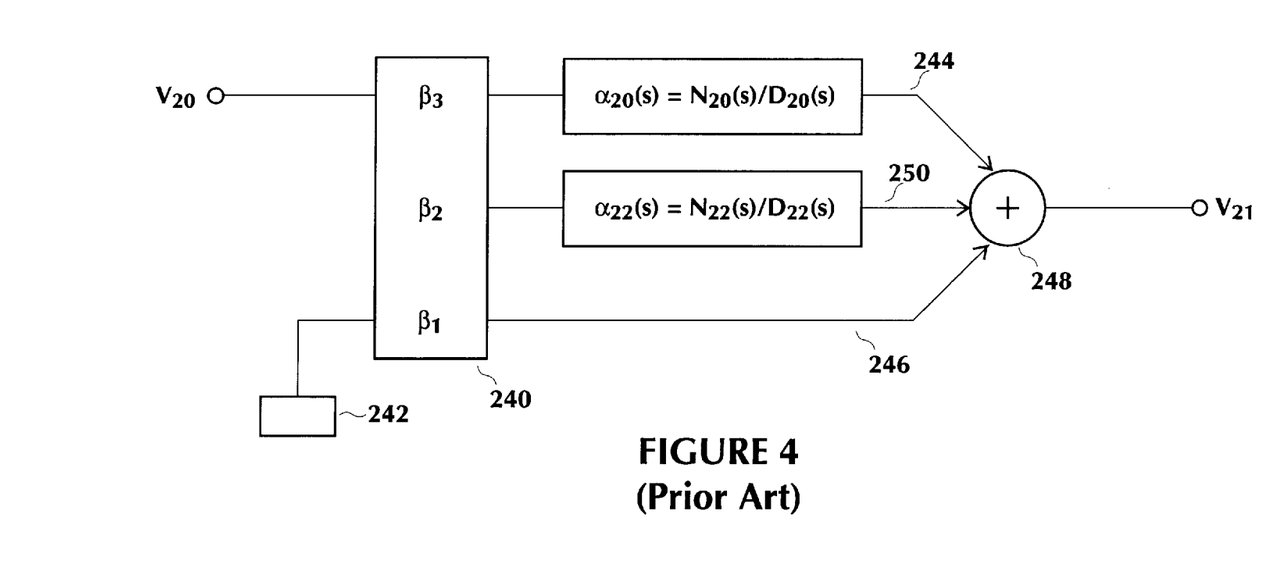
FIG. 4 illustrates an adaptive equalizer circuit according to the prior art including three equalization paths.

Korn also teaches an adaptive equalizer circuit, as illustrated in FIG. 4, having more than two paths, with each path 244, 246 and 250 designed for optimization of the reconstruction for a particular cable length. The degraded input signal is input proportionately into each of the reconstruction paths 244, 246 and 250 based on the level of the output signal measured at the node V21. The outputs of each of the reconstruction paths 244, 246 and 250 are then input into a summing circuit 248, thereby forming a reconstructed output signal. However, as taught by Korn, when an equalizer circuit with multiple paths is utilized the degraded input signal is split proportionately between all of the multiple paths.

What is needed is a general purpose equalizer which can satisfactorily reconstruct electronic signals transmitted over cables having a broad range of lengths utilizing a selective number of multiple paths in order to optimize a reconstructed signal at intermediate lengths. What is further needed is a digitally implemented control circuit for splitting an input signal proportionately between a selective number of multiple paths for optimizing a reconstructed signal.

SUMMARY OF THE INVENTION

An adaptive equalizer is configured to reconstruct electronic signals which are transmitted over signal cables, such as twisted pair cables. The equalizer satisfactorily reconstructs the signals over a broad range of cable lengths. Using the known degradation characteristics for a cable over a desired range of lengths, the adaptive equalizer includes multiple equalization paths, each of which are configured to reconstruct the input voltage signal optimized for a particular cable length. The degraded input signal is split according to a predetermined relationship into an appropriate two of the multiple equalization paths as controlled by a control logic circuit. Though each path is optimized to reconstruct the signal for a particular length of cable, the adaptive control adds a function of the actual cable length for more accurately reconstructing the signal. Each of the two active paths forms a partially reconstructed signal which is summed to form a composite reconstructed output signal. The control logic circuitry monitors the level of the output signal and adjusts a control signal appropriately in order to maintain the amplitude of the output signal in the required range. The control signal is used to determine the ratio of the input signal between the two active paths. A separate offset correction circuit also monitors the output signal for any offset and provides a correction signal to the input of the equalizer to compensate for the presence of any offset within the signal.

DETAILED DESCRIPTION OF THE PREFERRED EMBODIMENT

Figure 5:
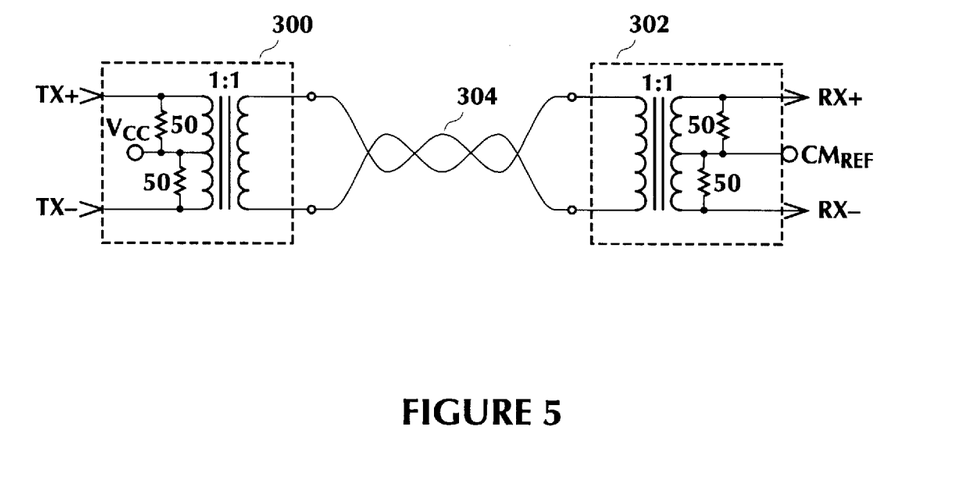
FIG. 5 illustrates a block diagram of an apparatus for transmitting signals between computer systems.

A block diagram of an apparatus for transmitting signals between computer systems is illustrated in FIG. 5. A cable 304 is coupled between a transmitter 300 and a receiver 302 for transmitting signals between the transmission isolation circuit 300 and the receiving isolation circuit 302. The transmission isolation circuit 300 is coupled to a transmitting computer system from which it receives the signals which are transmitted over the cable 304. The receiving isolation circuit 302 is coupled to a receiving computer system to which it sends the signals which are transmitted over the cable 304. Preferably, the cable 304 is a twisted pair cable. However, as will be apparent to those skilled in the art, the cable 304 may be any appropriate type of cable over which computer signals are typically transmitted.

The degradation or loss of a signal depends on the type of cable, the length of the cable and the frequency at which the signals are transmitted over the cable. The loss H of a cable may be represented by the following equation:

$$H(\omega) = e^{-\alpha L \sqrt{j\omega}}$$

where L is equal to the length of the cable and $\alpha$ is a constant which depends on the cable type. Because of this exponential relationship between the loss of a particular type of cable and the length of the cable, the loss of a particular length of cable L1 is equal to the loss of cable L2 multiplied by the loss of cable L3, as long as the lengths L2 and L3 of the two cables together equal the length of cable L1. This relationship is illustrated by the following equation:
where L1=L2+L3

$$H_{L1}(\omega)=H_{L2}(\omega) \times H_{L3}(\omega)$$

and therefore $$[e^{-\alpha L2\sqrt{j\omega}}][e^{-\alpha L3\sqrt{j\omega}}]=e^{-\alpha(L2+L3)\sqrt{j\omega}}=e^{-\alpha L1\sqrt{j\omega}}$$

A reconstruction circuit having an equalizer is used to minimize this loss for lengths of cable within a specific range of lengths. For instance the two-path equalizer as taught by Korn is optimized for cables having lengths of 0 and 100 meters. For intermediate lengths of cable between 0 and 100 meters, the original signal is reconstructed by proportionately splitting the input signal between the two paths of the equalizer, according to the level of the output signal, with each path forming a partially reconstructed signal. However, the loss for intermediate lengths of cable for this type of system can still be significant when compared to the loss for the optimized lengths of cable.

Figure 6:
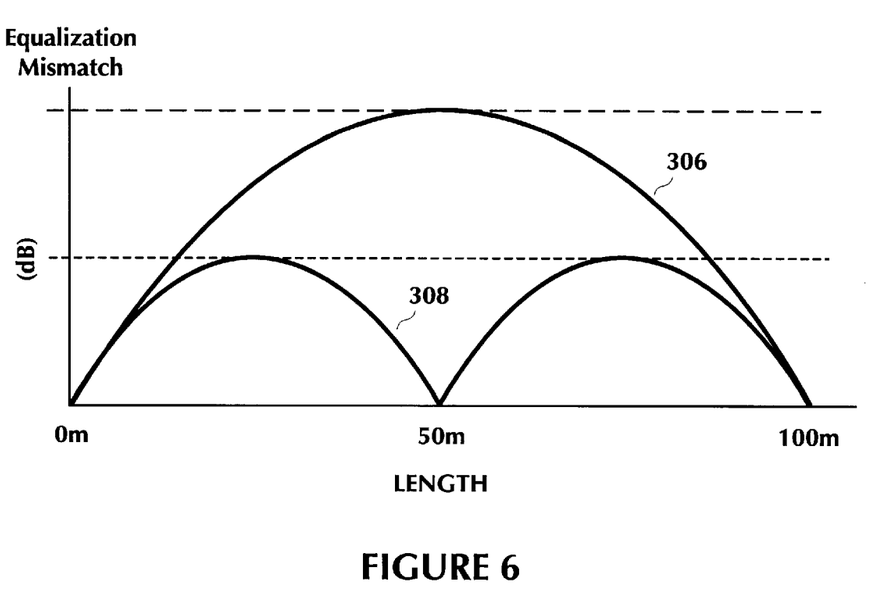
FIG. 6 illustrates a graphical representation of the equalization mismatch versus length characteristic for two equalization schemes.

FIG. 6 illustrates a graphical representation of the equalization mismatch versus length characteristic for two equalization schemes for a single frequency. The first waveform 306 represents the loss of an equalization scheme as taught by Korn, having two paths, optimized for 0 and 100 meter lengths of cable. As illustrated by the first waveform 306 the loss for this type of system reaches a maximum level for an intermediate length of cable halfway between the two optimized points, i.e., at 50 meters. The second waveform 308 represents the loss of an equalization scheme according to the present invention, having three equalization paths, optimized for 0, 50 and 100 meter lengths of cable. By including the middle path optimized for 50 meter cables, the loss of the system at intermediate lengths has been significantly reduced, as illustrated by the difference in height between the waveforms 306 and 308, for a particular length of cable. As illustrated by this second waveform 308 the loss for this system also reaches a maximum level for lengths of cable halfway between consecutive the optimized lengths. However, because the distance is shorter, the maximum amplitude of the waveform is less than the amplitude of the first waveform for any given length of cable. Thus, the equalizer circuit of the present invention includes multiple equalization paths, each optimized for a particular length of cable, in order to minimize the loss of a reconstructed signal. However, instead of proportionately dividing the input signal between all of the equalization paths as taught by Korn, the equalizer of the present invention only divides the input signal between an appropriate two of the equalization paths and then sums the partially reconstructed output of all of the paths together, thereby forming the output signal. In the preferred embodiment effectively only two paths are summed because the signal applied to the remaining or nonactive paths are multiplied by zero.

Figure 7:
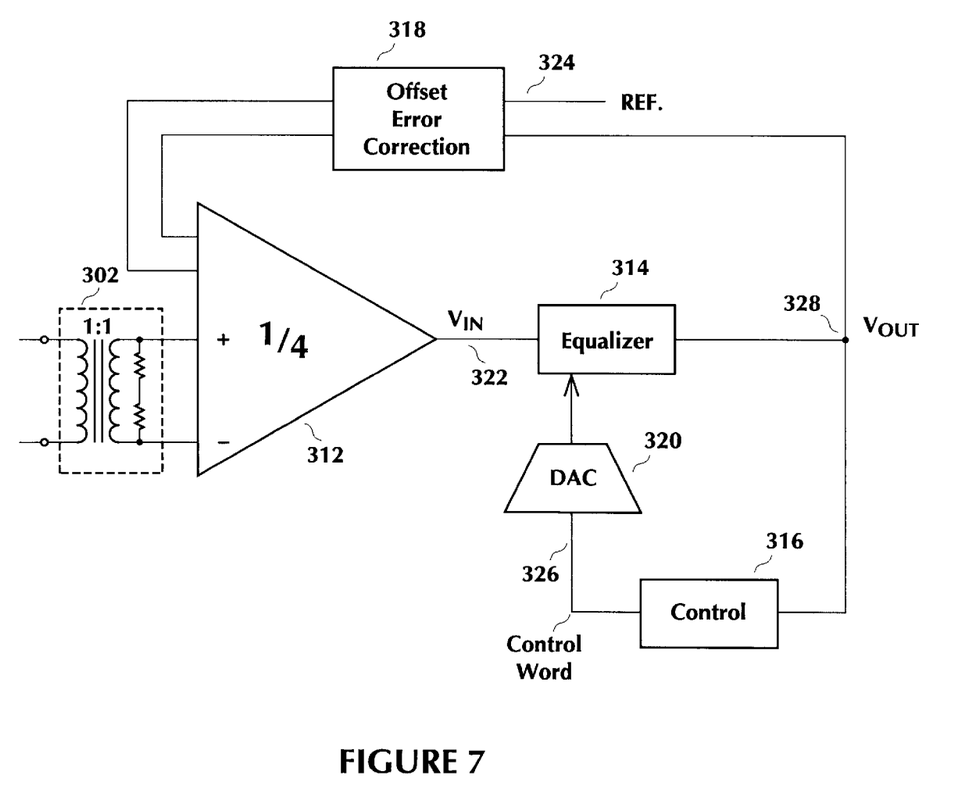
FIG. 7 illustrates a block diagram schematic of a reconstruction circuit according to the present invention.

A reconstruction circuit according to the present invention is illustrated in FIG. 7. The reconstruction circuit incorporates an equalizer circuit 314 which includes multiple equalization paths, each optimized for a particular length of cable, in order to minimize the loss of the reconstructed signal for intermediate lengths of cable. The control logic circuitry 316 monitors a level of the output signal at the node 328, determines the two appropriate paths for reconstruction and controls the portion of the input signal directed to the two paths being used to reconstruct the signal. An offset error correction circuit 3 18 is used to correct any offset or baseline wander within the reconstructed output signal at the node 328 by providing a correction signal to the input divider circuit 312.

In the reconstruction circuit of FIG. 7, the signal from the receiver 302 is input into an input divider circuit 312 which divides the signal by four in order to provide a more manageable operating signal level for the other circuitry within the reconstruction circuit. A differential output correction signal from the offset error correction circuit 318 is also input to the input divider circuit 312 in order to correct any offset within a reconstructed output voltage signal Vout. An input voltage signal Vin 322 is output from the input divider circuit 312 and input into the equalizer circuit 314. The output voltage signal Vout is output from the equalizer circuit 314 and coupled as an input to both the control logic circuitry 316 and to the offset error correction circuitry 318. The output voltage signal Vout provides the reconstructed output signal at the output node 328 which is an analog signal that is decoded and ultimately coupled to the receiving computer system. A control word is provided as an output from the control logic circuitry 316 on the control signal line bus 326. The control signal line bus 326 is coupled as an input to the digital to analog converter (DAC) 320. The DAC 320 provides an output which is input to the equalizer 314 and used to control the operation of the equalizer 314. A reference voltage signal 324 is input to the offset error correction circuit 318 for providing a reference level to which the output voltage signal Vout is compared.

Figure 8:
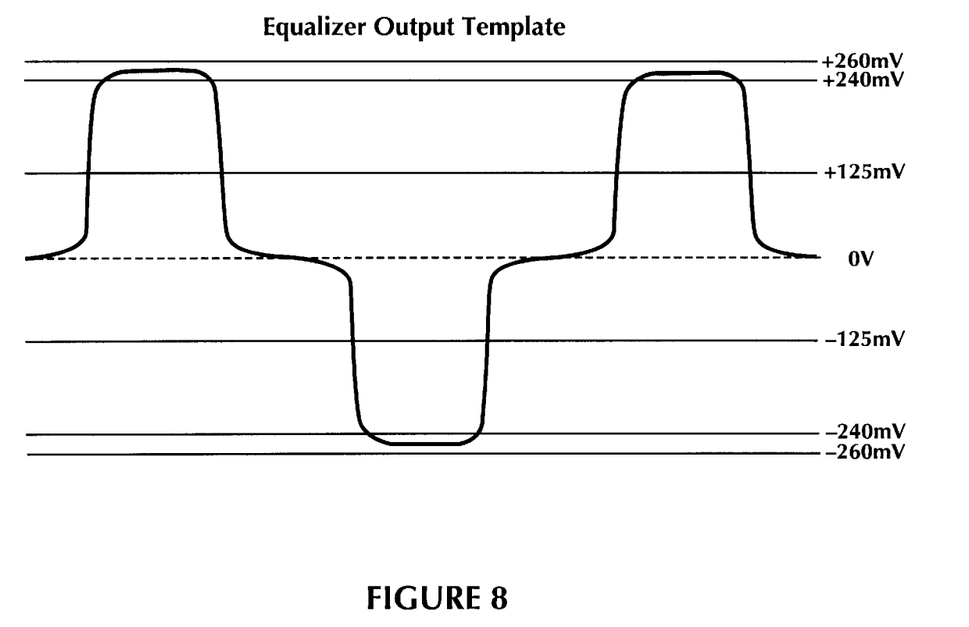
FIG. 8 illustrates an equalizer output template.

Twisted pair cable has a standard signal range from a minimum level of −1 volts to a maximum level of +1 volts. A transition of a signal transmitted over a twisted pair cable occurs when the signal rises above +500 millivolts or falls below −500 millivolts. An equalizer output template used by the control logic circuitry 316 is illustrated in FIG. 8. The levels illustrated are all ¼ of the appropriate levels due to the use of the input divider circuit 312 at the input of the reconstruction circuit of the present invention. Therefore, the maximum level of the signal output from the equalizer 314 should ideally be in the range of +240 to +260 millivolts, the minimum level of the signal output from the equalizer 314 should ideally be in the range of −240 to −260 millivolts and the transitions will occur when the signal rises above +125 millivolts or falls below −125 millivolts.

Figure 9:
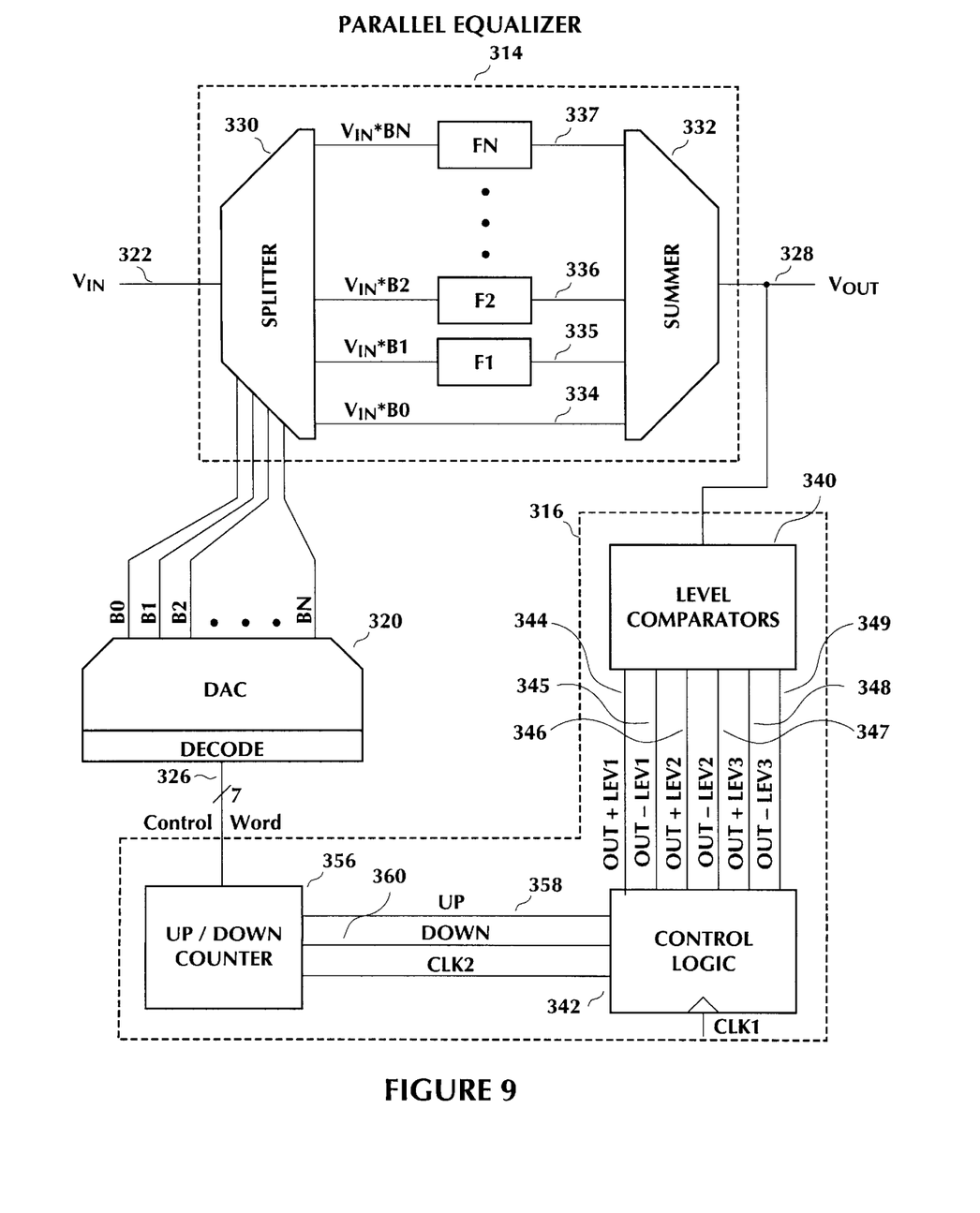
FIG. 9 illustrates a block diagram schematic of a parallel multipath equalizer and accompanying control logic circuitry according to the present invention.

A parallel multipath equalizer and accompanying control logic circuitry are illustrated in FIG. 9. The equalizer 314 includes the splitter 330 which splits the input signal Vin between any appropriate two of the multiple paths 334–337 as determined by the control logic circuitry 316. Each of the two active equalization paths then provides a partially reconstructed signal to the summer 332 which adds the signals together and provides the reconstructed output voltage signal Vout at the output node 328. The control logic circuitry 316 includes the level comparators 340 which monitor the reconstructed output voltage signal Vout 328, the up/down counter 356 which provides a control word to the DAC 320 and the control logic 342 which monitors the output of the level comparators 340 and provides control signals to the up/down counter to ensure that the level of the output voltage signal Vout is within the appropriate levels for the particular type of cable, (between −250 and +250 millivolts for twisted pair cable). The DAC 320 converts the digital control word provided from the up/down counter into an analog signal which is used to control the splitter 330 and the apportionment of the input voltage signal Vin between the appropriate two of the multiple equalization paths.

The input voltage signal Vin is coupled to the splitter 330. The equalizer 314 includes the multiple paths 335–337 through the filters F1–FN, each optimized for a particular length of cable. The path 334 does not include a filter as it is optimized for a cable having a length of 0 meters. The multiple equalization paths 334–337 are coupled to the outputs of the splitter 330 and as inputs to the summer 332. The summer 332 sums all the equalization paths of which all but two active paths are zero and outputs the total reconstructed signal as the output signal voltage Vout to the output node 328. The output signal voltage Vout is coupled as an input to the level comparators 340. The level comparators 340 monitor six voltage levels, as will be explained below, and output control signals on the level control signal lines 344–349, each for a different one of the six voltage levels. The control signal lines 344–349 are provided as inputs to the control logic circuitry 342. A clock reference signal CLK1 is also provided as an input to the control logic circuitry 342.

An up control signal is output from the control logic circuitry 342 on the up control signal line 358. A down control signal is output from the control logic circuitry 342 on the down control signal line 360. A second clock reference signal CLK2 is also output from the control logic circuitry 342. The up control signal line 358, the down control signal line 360 and the second clock reference signal CLK2 are all provided as inputs to the up/down counter 356 and allow the control logic circuitry 342 to control the output of the up/down counter 356 in a conventional manner. A digital control word is output from the up/down counter 356 on the control word signal line bus 326. The control word signal line bus 326 is coupled as an input to the DAC 320. The DAC 320 decodes the digital control word and converts it into a corresponding analog signal which is output on the control signal lines B0–BN which are provided as inputs to the splitter 330. The control signal lines B0–BN are input to the splitter 330 for controlling the apportionment of the input signal voltage Vin among the appropriate two of the multiple paths 334–337. In the preferred embodiment of the present invention the control word output from the up/down counter 356 includes seven bits.

Each of the control signal lines B0–BN correspond to one of the equalization paths 334–337. The splitter 330 takes the analog input signals provided from the DAC 320 on the control signal lines B0–BN and combines the signal on a respective control signal line with the input voltage signal Vin. The resulting proportional signal is then provided to the appropriate path and applied to the corresponding filter. In this manner the control logic 342 determines what the count should be and adjusts the output of the up/down counter 356 accordingly so that the appropriate ratios of signals are passed through the two active equalization paths. In the preferred embodiment of the present invention the DAC 320 outputs a current value on the control signal lines B0–BN. As will be apparent to those skilled in the art, a DAC which outputs a voltage value may also be implemented within the reconstruction circuit of the present invention.

Figure 10:
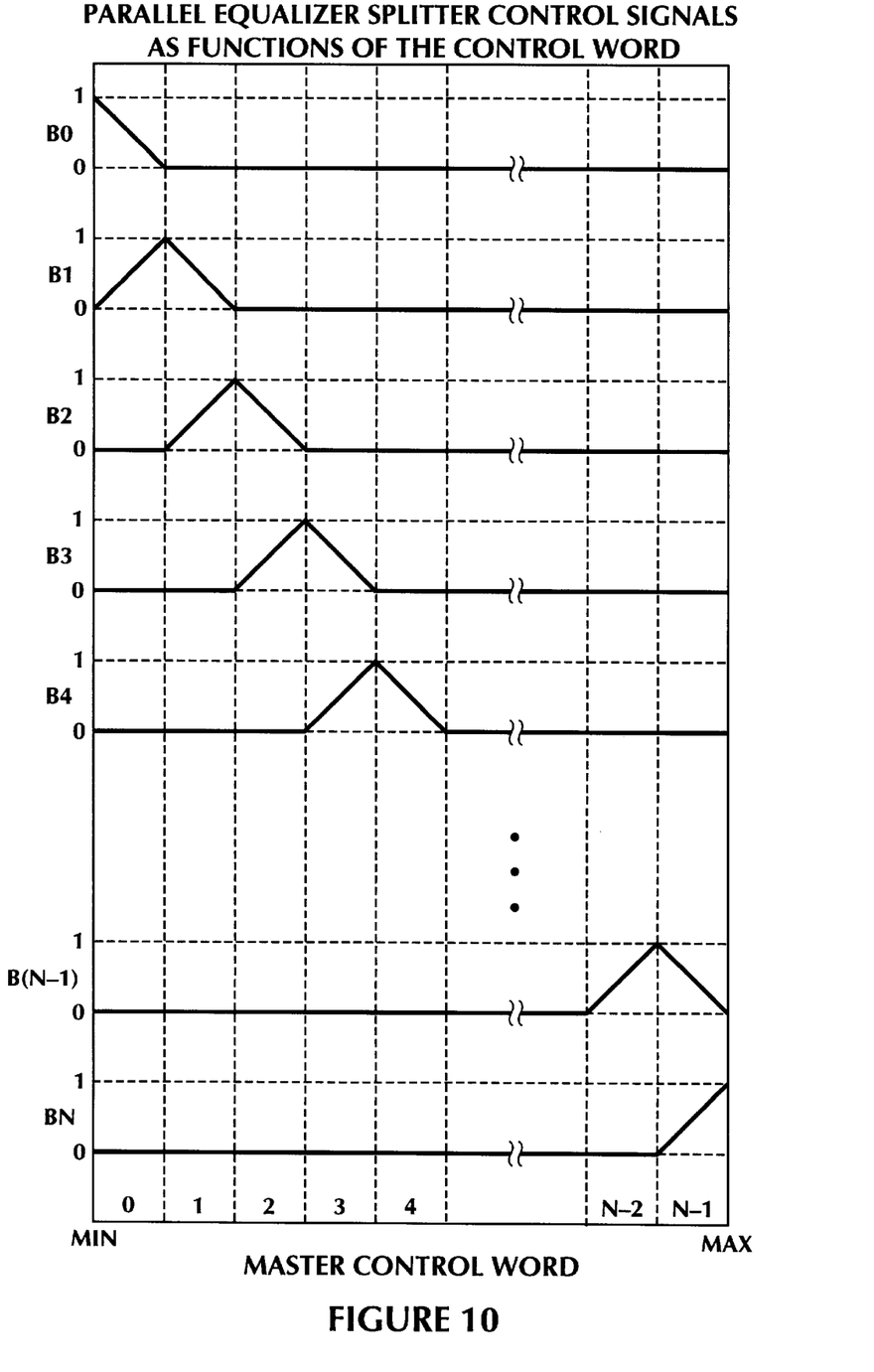
FIG. 10 illustrates a graphical representation of the control signals B0–BN for the control circuitry of the present invention.

A graphical representation of the control signals B0–BN for a range of control words is illustrated in FIG. 10. In order to maximize the optimization of an equalizer circuit according to the present invention, the equalization paths should each be optimized for different lengths of cable which proportionately divide the maximum length of cable expected. For example, if the equalizer circuit includes four equalization paths and is for reconstructing signals transmitted over cable lengths up to 100 meters, the equalization paths should be optimized for lengths of cable equal to 0 meters, 33 meters, 67 meters and 100 meters, respectively. In this example, for a length of cable greater than 0 meters and less than 33 meters, the signal will be apportioned appropriately between the first and second equalization paths as controlled by the control signals B0 and B1. As illustrated in FIG. 10, the control signal B0 starts at 1 for a cable length of 0 meters and decreases linearly to 0 for a cable length of 33 meters. Correspondingly, the control signal B1 starts at 0 for a cable length of 0 meters and increases linearly to 1 for a cable length of 33 meters. Therefore, for a particular length of cable between 0 and 33 meters, the control signals B0 and B1 combined should equal one. Correspondingly, for cable lengths between 33 and 67 meters the control signals B1 and B2 are proportionately active and for cable lengths between 67 and 100 meters the controls signals B2 and B3 are proportionately active. As will be apparent to those skilled in the art the number of control signals provided to the splitter 330 will correspond to the number of equalization paths included within the equalizer circuit 314.

The level comparators 340 monitor the level of the output voltage signal Vout and provide a signal on the level control signal lines when the output voltage signal Vout passes certain threshold levels. In the preferred embodiment of the present invention, six differential comparators are included within the level comparators 340 in order to detect when the output voltage signal Vout passes each of six different threshold levels. The first comparator provides a signal on the level control signal line 344 when the output voltage signal Vout rises above +260 millivolts. The second comparator provides a signal on the level control signal line 345 when the output voltage signal Vout falls below −260 millivolts. The third comparator provides a signal on the level control signal line 347 when the output voltage signal Vout rises above +240 millivolts. The fourth comparator provides a signal on the level control signal line 347 when the output voltage signal Vout falls below −240 millivolts. The fifth comparator provides a signal on the level control signal line 348 when the output voltage signal Vout rises above +125 millivolts. The sixth comparator provides a signal on the level control signal line 349 when the output voltage signal Vout falls below −125 millivolts.

The control logic circuitry 342 monitors the signals provided on the level control signal lines 344–349 from the level comparators 340 and adjusts the output of the up/down counter 356 accordingly. The control logic circuitry is implemented using digital circuitry. The digital control logic circuitry 342 monitors the status of the level control signal lines 344–349 and will adjust the up/down counter 356 periodically. Preferably, the up/down counter 356 is only adjusted one step up or down for a 1 microsecond period. If no change in the output of the up/down counter 356 is required over the 1 microsecond period then the digital control logic circuitry 342 will not activate the up or down signal lines 358 and 360. The digital control logic circuitry 342 monitors the status of the level control signal lines 344–349 and compares the output voltage signal Vout to the template illustrated in FIG. 8. The digital control logic circuitry 342 will adjust the up/down counter 356 up or down to ensure that the measured levels of the output voltage signal Vout will correspond to the expected levels of the output template.

The digital control logic circuitry 342 increments, decrements or keeps stable the output of the up/down counter 356 according to the following specific rules. The output voltage signal Vout is examined for at least 500 nanoseconds before any correction is made to the output of the up/down counter 356. The output of the up/down counter 356 is incremented by one if the output voltage signal Vout does not rise above the +125 millivolt level or does not fall below the −125 millivolt level during the 500 nanosecond sampling period. This signals that there is no signal input or the input signal is DC shifted. The output of the up/down counter 356 is also incremented by one if the output voltage signal Vout rises above the +125 millivolt level without rising above the +240 millivolt level or falls below the −125 millivolt level without falling below the −240 millivolt level during the 500 nanosecond sampling period. This signals that the amplitude of the output signal range is too small and should be further boosted. By incrementing the output of the up/down counter 356 the amplitude of the output voltage signal Vout is increased. The output of the up/down counter 356 is decremented by one if the output voltage signal Vout rises above the +260 millivolt level and falls below the −260 millivolt level during the 500 nanosecond sampling period. This signals that the amplitude of the output signal range is too large and should be reduced. By decrementing the output of the up/down counter 356 the amplitude of the output voltage signal Vout is decreased. If the output voltage signal Vout only rises above the +260 millivolt level or only falls below the −260 millivolt level this signals that the output voltage signal Vout is DC shifted. This DC shifting will be corrected by the offset correction circuitry as will be described below. The output of the up/down counter 356 is then converted to an analog signal by the DAC 320 and used to control the splitter 330 and the apportionment of the input signal Vin between the appropriate two of the multiple equalization paths.

DC offset or baseline wander in the voltage output signal Vout will occur due to asymmetrical serial data or more logic highs than logic lows occurring within the transmitted signal. Baseline wander occurs when a computer transmits a serial data packet that includes a long constant period without any edge transitions. This predominance of a single logic level over a period of time has a tendency to pull the DC component of the transmitted signal away from its center position. This DC offset can cause the logic levels of the serial data to drift or wander outside of the expected thresholds at the receiver and result in the loss of data.

The offset error correction circuit 318 monitors the output voltage signal Vout and compares it to the reference signal 324 in order to detect any offset or baseline wander within the output voltage signal Vout. A theoretical waveform is created by the offset error correction circuit 318 which represents what the incoming signal would look like if there were no offset. To detect the amount of offset present in the signal the error correction circuit 31 8 then compares the theoretical waveform to the actual output voltage signal Vout. An appropriate correction signal is then output by the offset error correction circuit 318 and integrated into the input voltage signal Vin by the input divider 312 in order to compensate for the offset in the transmitted signal.

Figure 11:
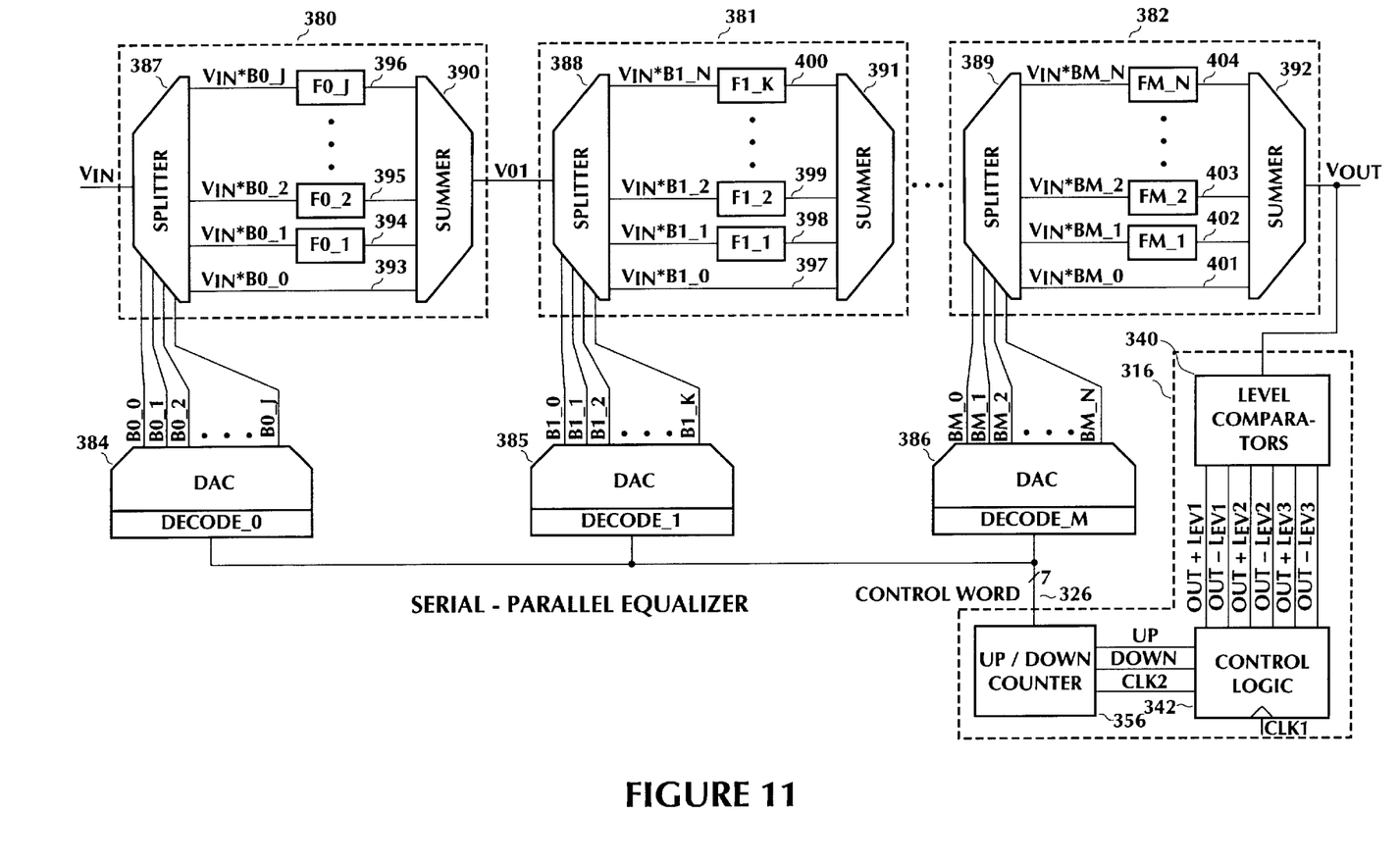
FIG. 11 illustrates a block diagram schematic of an alternate embodiment serial-parallel multipath equalizer and accompanying control logic circuitry according to the present invention.

An alternative embodiment of the reconstruction circuit is illustrated in FIG. 11. This embodiment includes multiple parallel equalizer circuits 380–382, as illustrated in FIG. 9, coupled together serially, with the output of each equalizer circuit coupled as the input to the successive equalizer circuit. The control logic circuitry 316 for this reconstruction circuit is the same as described above for the reconstruction circuit of FIG. 9. The voltage input signal Vin is coupled as an input to the splitter 387 of the first equalizer circuit 380. In the embodiment illustrated in FIG. 11, the equalizer circuit 380 includes four equalization paths 393–396 each coupled to an output of the splitter 387 and as an input to the summer 390. An output V01 of the summer 390 is coupled as input to the splitter 388 of the second equalizer circuit 381. The second equalizer circuit 381 also includes four equalization paths 397–400 each coupled to an output of the splitter 388 and as an input to the summer 391. An output of the summer 391 is coupled as an input to the splitter 389 of the third equalizer circuit 382. The equalizer circuit 382 also includes four equalization paths 401–404 each coupled to an output of the splitter 389 and as an input to the summer 392. An output of the summer 392 is provided as the output voltage signal Vout and is coupled to the level comparators 340. A control word is output from the up/down counter 356, as controlled by the control logic circuitry 342, and coupled as an input to each of the DACs 384–386. An output of the DAC 384 is coupled as an input to the splitter 387 for controlling the splitting of the input signal between the equalization paths. An output of the DAC 385 is coupled as an input to the splitter 388 for controlling the splitting of the input signal between the equalization paths. An output of the DAC 386 is coupled as an input to the splitter 389 for controlling the splitting of the input signal between the equalization paths.

Each parallel equalizer circuit 380–382 has an associated DAC 384–386 coupled to receive the control word from the up/down counter 356 and convert the control word into an analog signal used by the respective splitter 387–389 to appropriately apportion the input signal to the equalization paths. Each equalizer circuit 380–382 is configured to equalize for a specific range of cable lengths and each of the equalization paths within each equalizer circuit is optimized for a specific cable length within the corresponding range for the equalizer circuit. For example, if the circuit as illustrated in FIG. 11 were implemented for cable lengths up to 100 meters and included the three identical parallel equalizer circuits 380–382, each having two equalization paths then the first equalizer circuit 380 would be configured for cable lengths in the range of 0 to 33 meters, the second equalizer circuit 381 would be configured for cable lengths in the range of 33 to 67 meters and the third equalizer circuit 382 would be configured for cable lengths in the range of 67 to 100 meters.

Figure 12:
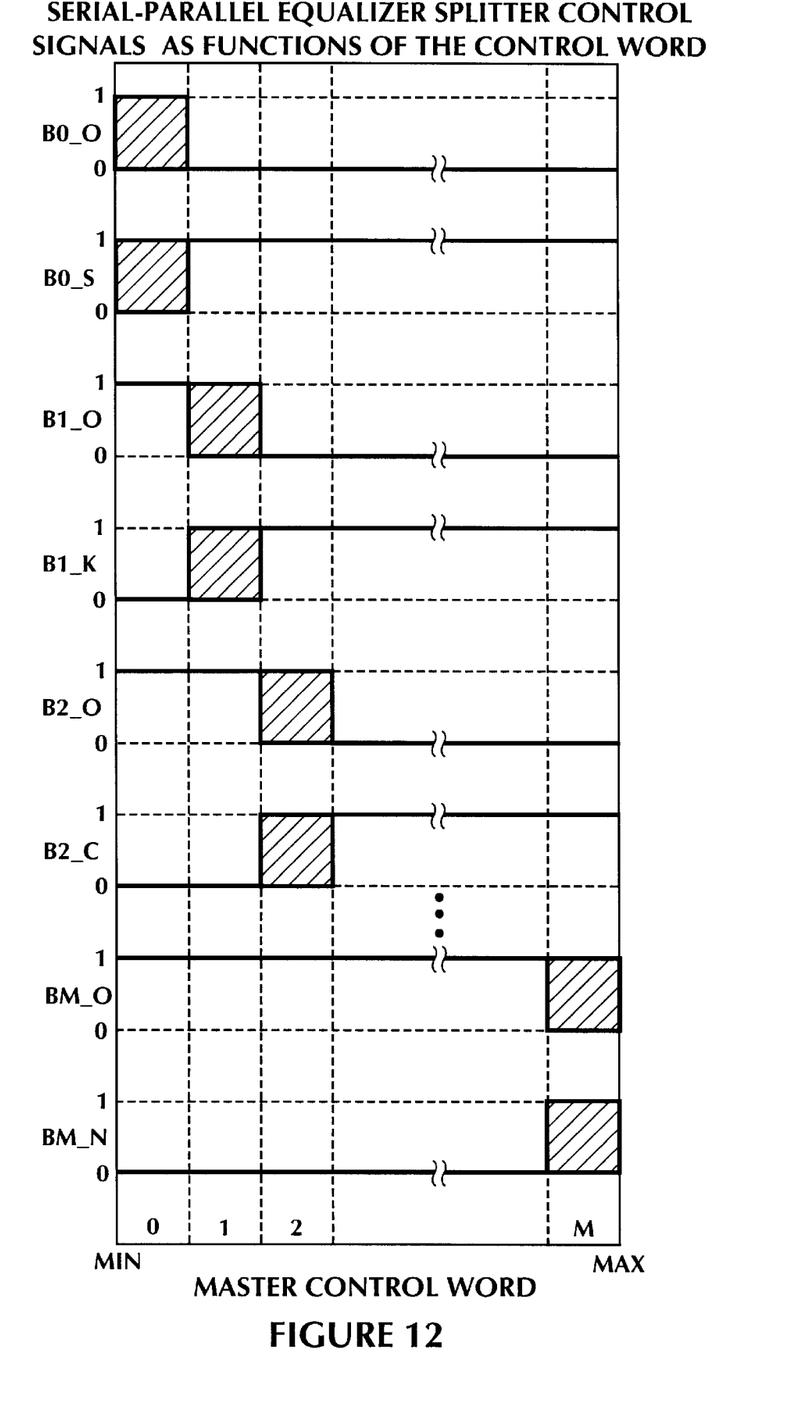
FIG. 12 illustrates a graphical representation of the control signals for the control circuitry of the alternate embodiment equalizer illustrated in FIG. 11.

A graphical representation of the control signals for a range of control words for the reconstruction circuit of FIG. II is illustrated in FIG. 12. The splitters 387–389 are controlled so that only one splitter is splitting a signal between two paths at any one time. If the length of cable for which the signal is being reconstructed is within the range of the second equalizer circuit 381, then the control signal B0_J is equal to one and the full input voltage signal Vin is passed through the top equalization path 396. Depending on where the cable length falls within the range of the second equalization circuit 381, the output signal V01 from the first equalization circuit 380 is split proportionately between two of the control signals B1_0 and B1_K. The partially reconstructed signals from each of the two paths 397 and 400 are then combined together by the summer 391 and a fully reconstructed signal is output from the second equalization circuit 381. Because the cable length fell within the range of lengths for which the second equalizer circuit 381 is optimized, the control signal BM_0 is set equal to one and the third equalizer circuit 382 merely passes the fully reconstructed signal through the bottom equalization path 401 which is optimized for cables of zero length.

As will be apparent from the above description only the splitter within whose optimum range the cable length falls is actively splitting a signal and preferably the signal is only split between two equalization paths. However, each equalization circuit 380–382 may include more than two paths in order to further minimize the error associated with reconstruction of transmission signals for intermediate lengths of cable. Within this embodiment, an active equalizer circuit is the equalizer circuit within whose optimum range the current cable length falls. For an equalizer circuit previous to the active equalizer circuit, all of the input signal is passed through the maximum length equalization path for that equalizer circuit. For an equalizer circuit subsequent to the active equalizer circuit, all of the input signal is passed through the equalization path optimized for cables of zero length.

For the serial-parallel equalizer as illustrated in FIG. 11, the control logic circuitry 316 operates the same as described above for the reconstruction circuit of FIG. 9 by monitoring the final output voltage signal Vout, comparing it to the expected template for the cable and adjusting the output of the up/down counter 356 as necessary to increase or decrease the amplitude of the output voltage signal Vout. The offset correction circuit 318 is not illustrated in FIG. 11 but will also be used with the reconstruction circuit of FIG. 11 to correct any offset within the output voltage signal Vout as explained above. In this manner, a transmitted signal is reconstructed by the reconstruction circuit illustrated in FIG. 11.

The reconstruction circuit according to the present invention includes a digital control logic circuit 316 and a separate offset correction circuit 318 for correcting any offset within the output voltage signal Vout and reconstructing the amplitude of a degraded transmitted signal for various lengths of transmission cable. In the reconstruction circuits of the prior art an analog control circuit was used which included an integral static offset correction circuit. By implementing the control circuitry digitally in the present invention, the equalization control loop and the offset correction loop may be separated to allow for dynamic offset correction.

The present invention includes an equalization circuit having multiple equalization paths, but the equalization control circuit is designed to only split the input voltage signal Vin between an appropriate two of the multiple paths at any one time thereby minimizing the potential loss of the reconstructed signal for intermediate lengths of cable. In contrast, the prior art reconstruction circuit, as taught by Korn, taught that the input signal was split proportionately between all of the multiple equalization paths.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that in both the parallel and serial-parallel embodiments of the present invention, any appropriate number of equalization paths may be included within an equalizer circuit.

We claim:

1. A multipath adaptive equalizer circuit comprising:
   a. at least three equalization paths, each optimized for the reconstruction of a transmitted signal over a specific length of cable;
   b. means for receiving an input signal;
   c. means for splitting coupled to the equalization paths and to the means for receiving, which splits the input signal into two intermediate signals and couples the intermediate signals to any two of the equalization paths wherein the two equalization paths are selectively active and any remaining equalization paths are not active, wherein a first partially reconstructed signal is provided by a first one of the active two equalization paths and a second partially reconstructed signal is provided by a second one of the active two equalization paths; and
   d. means for summing the first partially reconstructed signal and the second partially reconstructed signal.

2. The multipath adaptive equalizer circuit as claimed in claim 1 wherein the means for summing outputs a reconstructed output signal.

3. The multipath adaptive equalizer circuit as claimed in claim 2 wherein the means for splitting divides the input signal into portions related to M for the first signal component and 1-M for the second signal component.

4. The multipath adaptive equalizer circuit as claimed in claim 3 further comprising a control circuit coupled to the means for splitting and to the means for summing for monitoring the reconstructed output signal and controlling the splitting of the input signal into the active two of the plurality of equalization paths.

5. The multipath adaptive equalizer circuit as claimed in claim 4 further comprising an offset correction circuit coupled to the means for summing and to the means for receiving for monitoring the reconstructed output signal for any offset or baseline wander and providing a correction signal as an input to the means for receiving.

6. The multipath adaptive equalizer circuit as claimed in claim 5 wherein the cable is twisted pair cable.

7. A signal reconstruction circuit for reconstructing a transmitted signal comprising:
   a. a multipath adaptive equalizer circuit coupled to receive the transmitted signal including at least three equalization paths, each optimized for the reconstruction of a transmitted signal over a specific length of cable, wherein the equalizer circuit outputs a reconstructed output signal; and
   b. a control circuit coupled to the multipath adaptive equalizer circuit for monitoring the reconstructed output signal, comparing it to an expected signal and controlling a splitting of the transmitted signal into any two of the equalization paths wherein the two equalization paths are selectively active and any remaining equalization paths are not active.

8. The signal reconstruction circuit as claimed in claim 7 further comprising an offset correction circuit coupled to the multipath adaptive equalizer circuit for monitoring the reconstructed output signal for any offset or baseline wander and providing a correction signal as an input to the multipath adaptive equalizer circuit.

9. The signal reconstruction circuit as claimed in claim 8 wherein a first partially reconstructed signal is provided by a first one of the active two equalization paths and a second partially reconstructed signal is provided by a second one of the active two equalization paths.

10. The signal reconstruction circuit as claimed in claim 9 wherein the multipath equalizer circuit further comprises a means for summing the first partially reconstructed signal and the second partially reconstructed signal.

11. The signal reconstruction circuit as claimed in claim 10 wherein the means for summing outputs the reconstructed output signal.

12. The signal reconstruction circuit as claimed in claim 11 wherein the transmitted signal is split between the first and second one of the active two equalization paths with a component M provided to the first one of the active two equalization paths and a component 1-M provided to the second one of the active two equalization paths.

13. The signal reconstruction circuit as claimed in claim 12 wherein the cable is twisted pair cable.

14. A method of reconstructing a signal transmitted over a length of cable comprising the steps of:
   a. splitting a transmitted signal into two intermediate signals and coupling the two intermediate signals to any two of at least three equalization paths wherein the two equalization paths are selectively active and any remaining equalization paths are not active, each equalization path optimized for the reconstruction of a transmitted signal over a specific length of cable, wherein a first partially reconstructed signal is provided by a first of the active two of the equalization paths and a second partially reconstructed signal is provided by a second of the active two of the equalization paths;
   b. summing the first and second partially reconstructed signals thereby forming a reconstructed output signal; and
   c. monitoring the reconstructed output signal and adjusting the splitting of the transmitted signal according to a level of the reconstructed output signal.

15. The method as claimed in claim 14 further comprising the steps of monitoring the reconstructed output signal for offset or baseline wander and adding an appropriate correction signal to the transmitted signal to compensate for any offset or baseline wander.

16. The method as claimed in claim 15 wherein the transmitted signal is split with a component M provided to the first of the active two of the equalization paths and a component 1-M provided to the second of the active two of the equalization paths.

17. The method as claimed in claim 16 wherein the cable is twisted pair cable.

18. A signal reconstruction circuit for reconstructing a transmitted signal comprising:
   a. a plurality of serially coupled equalizer circuits wherein a first one of the plurality is coupled to receive the transmitted signal and a last one of the plurality outputs a reconstructed output signal wherein each of the serially coupled equalizer circuits comprises a multipath adaptive equalizer circuit having:
      i. at least three equalization paths, each optimized for the reconstruction of a transmitted signal over a specific length of cable;
      ii. means for receiving an input signal;
      iii. means for splitting coupled to the equalization paths and to the means for receiving, which splits the input signal into two intermediate signals and couples the intermediate signals to any two of the equalization paths, wherein the two equalization paths are selectively active and any remaining equalization paths are not active and wherein a first partially reconstructed signal is provided by a first one of the active two equalization paths and a second partially reconstructed signal is provided by a second one of the active two equalization paths; and
      iv. means for summing the first partially reconstructed signal and the second partially reconstructed signal; and
   b. means for controlling coupled to each of the plurality for controlling equalization of each of the plurality by monitoring the reconstructed output signal, comparing it to an expected signal and controlling equalization of each of the plurality.

19. The signal reconstruction circuit as claimed in claim 18 wherein each of the serially coupled equalizer circuits is configured for equalizing over a particular range of error introduction parameters, and further wherein the means for controlling includes means for selectively controlling an amount of equalization within each of the serially coupled equalizer circuits.

20. The signal reconstruction circuit as claimed in claim 19 wherein an appropriate one of the plurality of serially coupled equalizer circuits splits the transmitted signal into the active two equalization paths.

* * * * *

UNITED STATES PATENT AND TRADEMARK OFFICE
CERTIFICATE OF CORRECTION

PATENT NO.   :   5,844,941

DATED        :   December 1, 1998

INVENTOR(S)  :   Michael Mack et al.

It is certified that error appears in the above-identified patent and that said Letters Patent is hereby correct as shown below:

Column 3, line 53, add a comma after ""split"

Column 3, line 54, add a comma after "relationship"

Column 5, line 40, delete "the" between "consecutive and "optimized"

Column 5, line 66, delete "circuit 3 18" and insert --circuit 318--.

Column 9, line 47, delete "circuit 3 18" and insert --circuit 318--.

Signed and Sealed this

Twenty-third Day of March, 1999

Attest:

Q. TODD DICKINSON

Attesting Officer

Acting Commissioner of Patents and Trademarks